Patented Sept. 3, 1940

2,213,577

UNITED STATES PATENT OFFICE 2,213,577

MOLDING COMPOSITION

David E. Cordier, Toledo, Ohio, assignor to Plaskon Company, Incorporated, Toledo, Ohio, a corporation of Delaware No Drawing. Application September 13, 1938, Serial No. 229,784

3 Claims. (Cl. 260—33)

The invention relates to plasticized formaldehyde-urea molding compositions.

Formaldehyde-urea molding compositions are thermo-setting, i. e., when molded under elevated pressure and temperature they first soften and then harden at the molding temperature. A thermoplastic molding composition, in contrast, remains soft until the molded article has cooled. Although an article molded from a thermosetting composition can be removed from the mold after a relatively short time and while the article is still hot, an article molded from a thermoplastic composition cannot be removed from the mold until it has cooled, and thus hardened sufficiently so that it does not become blistered or distorted upon release of the pressure. The length of time for which a molding composition must be left in the mold is one of the factors that determines the cost of articles molded from the composition. A composition that must be left in the mold twice as long as another composition requires about twice as much molding equipment for the same volume of production, and hot-molding equipment is expensive.

Although the thermosetting character of formaldehyde-urea molding compositions is highly advantageous, the softening of such compositions that occurs in the mold before setting or hardening takes place is very important. A thermosetting composition that does not undergo proper initial softening in the mold cannot be molded properly. For example, an article molded from such a composition may not be properly homogeneous, and may consist of incompletely softened granules cemented together. Granular, unfused structure, due to insufficient softening of the composition in the mold, is found most frequently in the central portions of relatively thick articles, such as knobs and handles. Insufficient initial fusing results in an unhomogeneous appearance of the finished article, such as a streaked surface in the case of a colored article. The surface appearance that is produced by failure of a molding composition to soften before setting is known as "dog skin." When a molding composition does not soften sufficiently in the mold, bubbles or pockets of gas are frequently trapped, and produce flaws in the finished article.

Although acid substances have been used as plasticizers in formaldehyde-urea molding compositions containing no cellulose, such substances cannot be used in a composition containing cellulose as a filler, because they render it unstable and cause rapid deterioration. Formaldehyde-urea molding compositions containing no cellulose have not been found satisfactory for commercial use.

To be suitable for use as a plasticizer, a substance should not be so alkaline as to prevent the formaldehyde-urea molding composition from hardening in the mold. Substances that are highly soluble in water cannot be used as plasticizers, because they seriously impair the resistant properties of a formaldehyde-urea resin.

Phenol has been suggested as a plasticizer for formaldehyde-urea molding compositions, but it is unsatisfactory because it imparts an undesirable color and odor to the compositions. Moreover, the color of a formaldehyde-urea composition containing phenol is so unstable that the composition would have to be handled in a refrigerated dark room to prevent the appearance of the molded articles from being spoiled. Toluene sulfonamides have been used for want of better plasticizers, but their plasticizing effect is so slight that they are of little value.

Only substances that are soluble in formaldehyde-urea resin can be used as plasticizers, because insoluble substances bleed out of the resin and thus spoil molded articles in which they are used. The substances that are soluble in formaldehyde-urea resin are very limited in number. Most of such substances seem to have a molecular structure similar to that of the resin; for example, certain urea derivatives are soluble in formaldehyde-urea resin. However, urea derivatives in general do not have a plasticizing effect upon formaldehyde-urea molding compositions. Urea itself cannot be used as a plasticizer because of its deleterious effect upon the product. The substances that are both soluble in formaldehyde-urea resin and capable of appreciably plasticizing a formaldehyde-urea molding composition are extremely rare.

The principal object of the invention is to provide a formaldehyde-urea molding composition containing a novel plasticizer. More specific objects and advantages are apparent from the description, which merely discloses and illustrates the invention and is not intended to impose limitations upon the claims.

A formaldehyde-urea molding composition embodying the invention contains the substance whose molecule is formed by the condensation of 4 molecules of formaldehyde with 2 molecules of ethylene diamine as a plasticizer. The condensation product is believed to have the following structural formula:

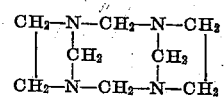

This substance is particularly suitable for a plasticizer because of its neutrality. Its preparation is described in Beilstein, v. 4, p. 231.

A formaldehyde-urea molding composition of the usual type, consisting primarily of cellulosic material (40 to 50%) and a formaldehyde-urea reaction product, may be employed.

Example

A dried formaldehyde-urea molding composition containing 35 parts of alpha-cellulose fiber impregnated with 50 parts of a formaldehyde-urea reaction product is ground in a ball mill, together with 4 parts of the substance whose molecule is formed by the condensation of 4 molecules of formaldehyde with 2 molecules of ethylene diamine. The customary modifiers, such as lubricants, accelerators, and coloring matter, may also be added to the ball mill. After an intimate mixture has been obtained in the form of a fine powder, it may be granulated or formed into pellets so that it can be used conveniently for charging molds. The molding is performed under a suitable pressure at a temperature of about 150° C.

Various applications of the invention may be devised to meet various requirements.

Having described my invention, I claim:

1. A thermosetting molding composition comprising a formaldehyde-urea reaction product and the substance whose molecule is formed by the condensation of 4 molecules of formaldehyde with 2 molecules of ethylene diamine as a plasticizer.

2. A formaldehyde-urea molding composition comprising a formaldehyde-urea reaction product, cellulosic material, and the substance whose molecule is formed by the condensation of 4 molecules of formaldehyde with 2 molecules of ethylene diamine as a plasticizer.

3. A formaldehyde-urea molding composition comprising about 5 per cent of the substance whose molecule is formed by the condensation of 4 molecules of formaldehyde with 2 molecules of ethylene diamine as a plasticizer.

DAVID E. CORDIER.